UNITED STATES PATENT OFFICE.

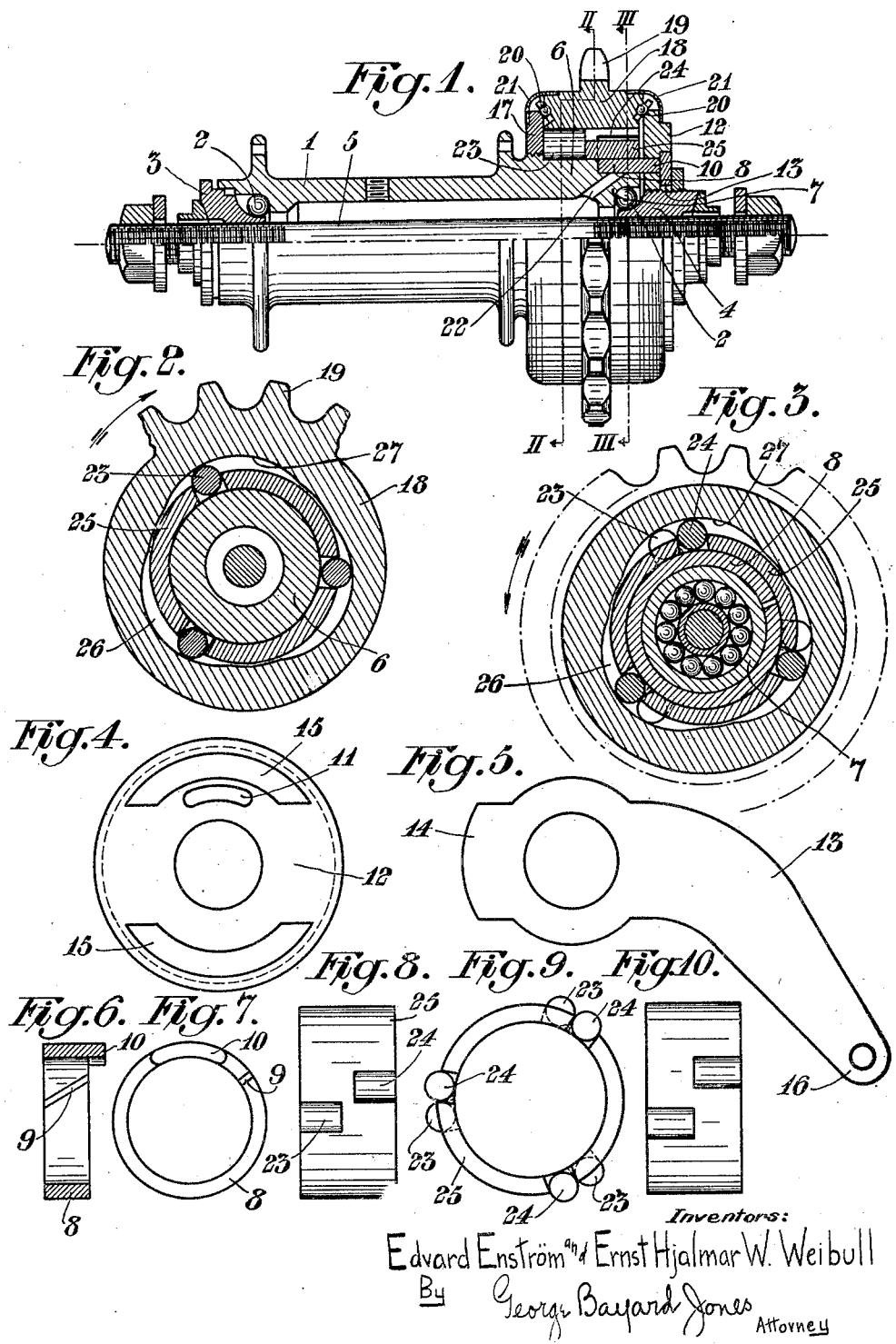

EDVARD ENSTRÖM, OF LIDKÖPING, AND ERNST HJALMAR WALODDI WEIBULL, OF GOTTENBORG, SWEDEN.

BACK-PEDALING BRAKE AND COASTER.

1,346,118.  Specification of Letters Patent.  Patented July 13, 1920.

Application filed May 16, 1919. Serial No. 297,646.

*To all whom it may concern:*

Be it known that we, EDVARD ENSTRÖM and ERNST HJALMAR WALODDI WEIBULL, subjects of the King of Sweden, and residents, respectively, of Lidköping, in the Kingdom of Sweden, and of Gottenborg, in the Kingdom of Sweden, have invented a new and useful Improvement in Back-Pedaling Brakes and Coasters, of which the following is a specification.

The present invention relates to an improvement in a back-pedaling brake and coaster of the type in which there are provided two rows of engagement members, such as rollers or balls, between, on the one hand, the driving sprocket and, on the other hand, the barrel hub and a brake ring surrounding said barrel hub, which engagement members coöperate with surfaces of recesses or the like in the driving sprocket eccentric to the axis of the hub, for producing engagement, by means of the one row, between the barrel hub and the driving sprocket when said sprocket is turned in the one direction, and by means of the other row, engagement between the brake ring and the driving sprocket when said sprocket is turned in the other direction. The improvement consists principally in this that both rows of engagement members are guided by a common retainer.

In back-pedaling brakes and coasters of the type referred to, which are thus provided with two engagement means one of which is operative when turning the driving sprocket in the one direction, and the other of which is operative when turning the driving sprocket in the other direction, and in which the engagement members consist of rollers or balls, the said engagement means have heretofore been constructed in the usual manner for ball or roller ratchets, that is to say, the eccentric surfaces of the recesses in the driving sprocket are limited in the one direction by a substantially radial surface which serves as a stop for the rollers or balls when the driving sprocket is turned in the direction in which the engagement means is operative, that is to say, when the rollers or balls are not clamped between the said eccentric surfaces of the recesses and the barrel hub or the brake ring.

In back-pedaling brakes and coasters according to the present invention in which both rows of rollers or balls are guided by a common retainer, it will be obvious, however, that the rollers or balls of the one row are not to be stopped in the said manner until the rollers or balls of the other row have been clamped or secured between the eccentric surfaces of the corresponding recesses in the driving sprocket, and the barrel hub or the brake ring, and further that the said clamping or engagement having been effected, the rollers or balls of the first named row are maintained by the retainer in a certain definite position in which, of course, they must be out of engagement with the corresponding eccentric surfaces in the driving sprocket and with the brake ring or the barrel hub.

In accordance herewith the present invention also contemplates a simpler and consequently less expensive manufacture of the eccentric surfaces in the driving sprocket. This improvement consists in this that the said surfaces in the driving sprocket with which the locking members coöperate, are eccentric at both ends of each recess in the peripheral direction so that the said surfaces converge in both peripheral directions toward the surfaces of the barrel hub or the brake ring. By this means it is possible to place a roller or a ball of each row in a single recess in the driving sprocket, whereby the number of recesses may be reduced to one-half of the number ordinarily used, and the manufacture of the recesses may also be made in a simpler manner than theretofore, since the said recesses may for instance be milled out in the interior cylindrical surface of the driving sprocket by means of a cylindrical cutter, such manufacture being obviously impossible with the shape or contour of the recesses heretofore used where the eccentric surface, which is also cylindrical as a rule, is bordered or cut off, so to say, by a plane surface approximately at right angles to the first-named surface.

In the accompanying drawing an embodiment of a back-pedaling brake and coaster according to the present invention is illustrated by way of example. Figure 1 shows an axial section through the brake. Fig. 2 shows a cross section on the line II—II in Fig. 1, and Fig. 3 shows a cross section on the line III—III in Fig. 1. Fig. 4 shows a side view of a disk for retaining the brake ring. Fig. 5 shows a side view of an arm for securing said disk. Fig. 6 shows a section and Fig. 7 an end view of the brake ring. Fig. 8 shows a side view and Fig. 9 an end view of the retainer. Fig. 10 shows a somewhat modified construction of a retainer.

The brake consists of a barrel hub 1 journaled by means of balls 2 on the cones 3, 4 which are screwed onto the shaft 5. The barrel hub 1 is provided at one end with an extension 6 with a turned-off portion 7 surrounded by a brake sleeve or ring 8 having a suitably inclined cut 9, Fig. 6, so as to become resilient. The brake ring 8 has a lug 10 protruding in axial direction into a correspondingly shaped slot 11 in a disk 12 which is screwed onto the cone 4. The disk 12 and thus also the brake ring 8 are prevented from turning by an arm 13, Fig. 5, one end 14 of which is introduced between a pair of curved lugs 15 on the disk 12, Fig. 4, and the other end 16 of which is secured in the well-known manner to the frame in which the brake is mounted.

A ring or a flange 17 is secured to the extension 6 of the barrel hub 1, a ring 18 which in the embodiment illustrated is made integral with the driving sprocket 19, being placed between said flange 17 and the disk 12 and journaled on said flange and said disk by means of ball bearings 20. In order to prevent dust and the like from entering the bearings and the interior of the brake, rings 21 of approximately angular cross section are secured to the ring 18, said rings 21 bearing against the outside surfaces of the flange 17 and of the disk 12.

In the barrel hub there are holes 22 leading from the interior of said barrel hub to the cylindrical surface of the turned-off portion 7, which surface is the bearing surface for the brake ring 8. Lubricant will thus be supplied through said holes 22 to said surface from the hollow chamber provided in the interior of the barrel hub, this hollow chamber being supplied with lubricant through the hole in the barrel hub shown in Fig. 1.

Between the ring 18 and the barrel hub there are two rows of rollers, 23, 24, the rollers 23 of one of said rows being placed between the ring 18 and the cylindrical surface of the extension 6, and the rollers 24 of the other row being placed between the said ring 18 and the brake ring 8. The rollers 23 as well as the rollers 24 are placed in slots or notches in a retainer 25, hence both rows of rollers are guided by a common retainer. The rollers 23 and 24 project partly into recesses 26 in the interior cylindrical surface of the ring 18.

It will be understood by reference to Figs. 1 and 3 that one roller 23 and 24 of each row are placed in a single recess 26 in the ring 18 approximately in alinement with one another. The surfaces 27 of the recesses 26 are eccentric with relation to the axis of rotation of the ring 18 in both peripheral directions, that is to say, each of said surfaces converges in both peripheral directions toward the cylindrical surfaces of the extension 6 and the brake ring 8 consequently, on turning the driving sprocket in the direction indicated by the arrow in Fig. 2, the rollers 23 will be clamped or secured at the one end of the recesses 26 between the ring 18 and the extension 6 thus producing engagement between said two members so that the barrel hub will be caused to take part in the rotation, whereas on turning the driving sprocket in the other direction as indicated by the arrow in Fig. 3, the rollers 24 will be clamped or secured at the opposite ends of the recesses 26 taken in the peripheral direction, between the ring 18 and the brake ring 8. Said brake ring 8 being secured against rotation, on said turning of the driving sprocket the brake ring will of course, by the action of the eccentric surfaces 27 of the recesses 26 on the rollers 24, be forced against the surface of the turned-off portion 7 and thus brake the barrel hub 1.

When a roller of each row is placed in the manner above described in the same recess, the brake may, of course, easily be made in such manner that only a very inconsiderable movement of the driving sprocket relatively to the retainer is required in order to move the one or the other row of rollers into operative engagement with the driving sprocket. Said movement will, of course, be equivalent to the difference between the peripheral distance between the axis of the roller of the one row when in position of engagement, and the axis of the roller of the other row when in position of engagement, and the actual peripheral distance between the axes of the rollers in the retainer 25. It will be obvious that the first-named distance may easily and precisely be given the desired dimension when the rollers are located in the same recess.

It will be understood, however, that it offers considerable advantages from the point of view of manufacture to make the recesses 26 in the manner above described, also in such cases where only one roller is placed in each recess, the number of recesses thus being twice as large.

In the embodiment above described with reference to Figs. 1 to 9 inclusive the rollers 23 as well as the rollers 24 are shorter than half the width of the retainer 25 for the purpose of enabling the rollers to be placed close to one another in the peripheral direction and thus to give the recesses 26 the shortest extension possible in said direction. There is of course no objection, however, to making the length of the rollers equal to half the width of the retainer, as shown in Fig. 10, whereby a larger bearing surface will be obtained for locking together the driving sprocket and the barrel hub, as well as for braking. The extension of the surface of the recess in the peripheral direction will then, of course, become somewhat larger, or its curvature somewhat sharper.

Rollers are preferred as engagement members for the present back-pedaling brake and coaster, but balls may of course also be used as engagement members in the application of the invention.

We claim:

1. In a back-pedaling brake and coaster, the combination of a barrel hub, a brake ring surrounding a portion of said barrel hub, a row of engagement members around said brake ring, a second row of engagement members around a portion of said barrel hub, a common retainer for both said rows of engagement members, and a driving sprocket surrounding both said rows of engagement members and provided with eccentric surfaces for engagement with said members.

2. In a back-pedaling brake and coaster, the combination of a barrel hub, a brake ring surrounding a portion of said barrel hub, a row of engagement members around said brake ring, a second row of engagement members around a portion of said barrel hub, a common retainer for both said rows of engagement members, and a driving sprocket surrounding both said rows of engagement members and provided with surfaces for engagement with said members, said surfaces being eccentric at both ends in the peripheral direction, so as to converge toward the surfaces of said barrel hub and said brake ring in both peripheral directions.

3. In a back-pedaling brake and coaster, the combination of a barrel hub, a brake ring surrounding a portion of said barrel hub, a row of engagement members around said brake ring, a second row of engagement members around a portion of said barrel hub, a common retainer for both said rows of engagement members, and a driving sprocket surrounding both said rows of engagement members and provided with recesses having cylindrical surfaces for engagement with said members, said surfaces converging toward the surfaces of said barrel hub and said brake ring in both peripheral directions.

4. In a back-pedaling brake and coaster, the combination of a barrel hub, a brake ring surrounding a portion of said barrel hub, a row of engagement members around said brake ring, a second row of engagement members around a portion of said barrel hub, a common retainer for both said rows of engagement members, and a driving sprocket surrounding both said rows of engagement members and provided with recesses the surfaces of which being parts of cylindrical surfaces intersecting the interior cylindrical surface of said driving sprocket and adapted for engagement with the said engagement members.

5. In a back-pedaling brake and coaster, the combination of a barrel hub, a brake ring surrounding a portion of said barrel hub, a row of engagement members around said brake ring, a second row of engagement members around a portion of said barrel hub, a common retainer for both said rows of engagement members, and a driving sprocket surrounding both said rows of engagement members and provided with recesses having surfaces for engagement with said members and converging toward the surfaces of said barrel hub and said brake ring in both peripheral directions, an engagement member of each row being placed in each recess in the driving sprocket.

EDVARD ENSTRÖM.
ERNST HJALMAR WALODDI WEIBULL.